United States Patent [19]
Behnke

[11] 3,936,832
[45] Feb. 3, 1976

[54] SYSTEM TO PROCESS ANTENNA BEAMS TO OBTAIN THE ANGULAR LOCATION OF TARGET WITH HIGH RESOLUTION AND ACCURACY

[75] Inventor: Marvin C. Behnke, deceased, Late of Hermosa Beach, By Rita Behnke, Legal Representative; Hermosa Beach, Calif.

[73] Assignee: The United States of America as represented by the Secretary of the Navy, Washington, D.C.

[22] Filed: Sept. 13, 1974

[21] Appl. No.: 505,719

[52] U.S. Cl. .................. 343/119; 343/122; 343/123
[51] Int. Cl.² ........................................... G01S 3/30
[58] Field of Search......... 343/119, 123, 113 R, 122

[56] References Cited
UNITED STATES PATENTS

| | | |
|---|---|---|
| 3,089,139 | 5/1963 | Hovannesiau et al. ............. 343/122 |
| 3,345,633 | 10/1967 | Rlinge................................. 343/122 |
| 3,824,595 | 7/1974 | Hall .................................... 343/119 |

Primary Examiner—T. H. Tubbesing
Assistant Examiner—Richard E. Berger
Attorney, Agent, or Firm—R. S. Sciascia; R. F. Beers; N. Ellis

[57] ABSTRACT

The system comprises a set of 16 antennas disposed so that their beams overlap to cover completely some sector of area; a mixing system to provide a plurality of I.F. signals; a first detector for each I.F. signal which applies this signal to a comparison and display system which determines and then displays whichever of the I.F. signals has the strongest amplitude; a second detector for each I.F. signal which applies said I.F. signal to a circuit which combines the plurality of I.F. signals into two sine-waves, these two sine-waves being applied to the vertical and horizontal deflection plates of an oscilloscope. The oscilloscope display expands the azimuth of the target path across to each of the 16 beams from 2° to 90°. Thus the target location within a particular beam can be determined very accurately. A light display indicates which particular beam is being traversed at any particular time.

11 Claims, 10 Drawing Figures

SYSTEM TO PROCESS ANTENNA BEAMS TO OBTAIN THE ANGULAR LOCATION OF TARGET WITH HIGH RESOLUTION AND ACCURACY

BACKGROUND OF INVENTION

Field of Invention

This invention relates to radar systems and in particular to radar receiving systems for determining angular location with a high degree of accuracy.

Prior art radar systems generally have emphasized range accuracy and resolution of the radar target. The angular location of the radar target was generally determined using very inaccurate methods. There has long been a need for a device to display angular location of a radar target with a high degree of accuracy and resolution. One prior-art, angle-sensing system attempting to do this comprises a plurality of antennas coupled with signal-processing equipment to compare the signal amplitudes on adjacent channels. Another prior-art system uses phase-comparison techniques with a plurality of spatially disposed antennas. The reception times and phases at each of the plurality of antennas are measured and compared. The phase differences indicate the relative bearing of the target.

BRIEF SUMMARY OF THE INVENTION

The present invention provides a radar system which combines a high degree of angular accuracy and resolution with simplicity of construction and low cost.

Briefly, the invention comprises:

a plurality of antennas disposed to provide overlapping output beams completely covering a sector of area;

a mixing system to provide an I.F. signal from each of the antennas;

a set of at least two detectors for each antenna I.F. signal, one of the detectors applying a signal to a comparison circuit which determines which of the antenna I.F. signals has the largest amplitude, the other detector applying a signal to an inverting and combining circuit which coverts the plurality of antenna signals into a set of two sine-waves, these two sine waves being applied to the vertical and horizontal deflection plates respectively of a display device. The comparison device gives a rough estimate of target position by indicating which antenna beam is being traversed at a particular time. The display device expands the antenna beam azimuth across which the target is traveling such that the target location within a particular beam can be determined very accurately by observing the target dot or line on the display device.

OBJECTS OF THE INVENTION

An object of the present invention is to determine the angle of a target location with a high degree of accuracy and resolution.

Another object of the present invention is to simplify construction and lower the cost of radar angle-determining systems while improving the angle accuracy which is obtained.

DETAILED DESCRIPTION OF THE INVENTION

In order to obtain a high degree of accuracy of target angular location, a means to compare a plurality of antenna beams was devised. One section of the invention gives a general target angular location by determining which of the plurality of antenna beams has the strongest amplitude signal. The precise angular location is then determined by noting the location of a point or a line on a display device giving an expanded view of the beam azimuth being crossed by the target.

The antenna system will first be discussed. The general theory behind this invention is that angular location can be determined by noting which antenna beam out of a group of overlapping antenna beams covering a particular sector of area has the strongest amplitude signal.

Any means that could provide a pattern of overlapping antenna beams that would completely fill a disignated sector of area could be used. One way to achieve this result would be to form a group of contiguously placed antennas so positioned that their beams would overlap. The problem with this type of system is that radar space is usually at a premium. Thus a system with a plurality of antennas would be quite bulky and space-consuming.

The present invention provides an antenna system which greatly alleviates this space problem.

Applicant's antenna systems comprises one constant, dielectric, ceramic lens as the receiving aperture, in combination with a plurality of small, dielectrically loaded, feed-horns set behind the lens. Each lens-feed-horn combination constitutes a single antenna system which produces a narrow pencil-beam.

In applicant's embodiment 16 of these lens-feed-horn combinations are arranged contiguously to have overlapping beams to cover a sector of space 31° in azimuth by 3° in elevation.

Figure 1:
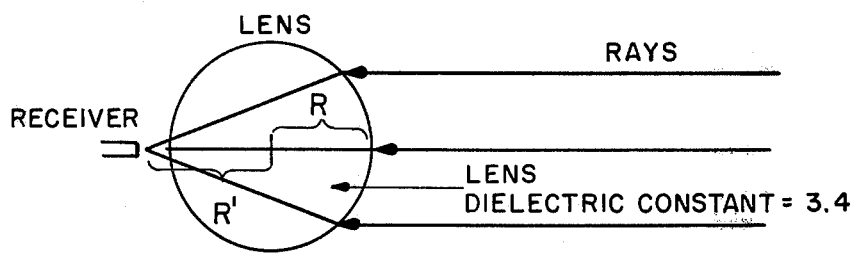
FIG. 1 illustrates the ray paths of a constant dielectric lens.

The focusing lens used is a spherical ceramic lens having a uniform, dielectric constant of 3.25. The lens design is based on thick-lens optical principles and focuses energy at a point diametrically opposed to the direction of the incident energy. The approximate expression for the focusing of a constant dielectric lens is given by $$\frac{R'}{R} = \frac{K}{\sqrt{2}(K-1)}$$

where $R$ is the lens radius, $R'$ is the focal distance, and $K$ is the dielectric constant. FIG. 1 is a ray-tracing diagram which illustrates this optical principle.

The feed-horns are located at the back of the lens. The lens acts to focus the energy from a feed-horn into a beam projecting out into space. In this embodiment a series of 16 feed-horns in combination with the lens provides 16 independent beams whose crossover level (point at which the antenna lobes cross) is determined by the interfeed horn spacing.

Figure 2:
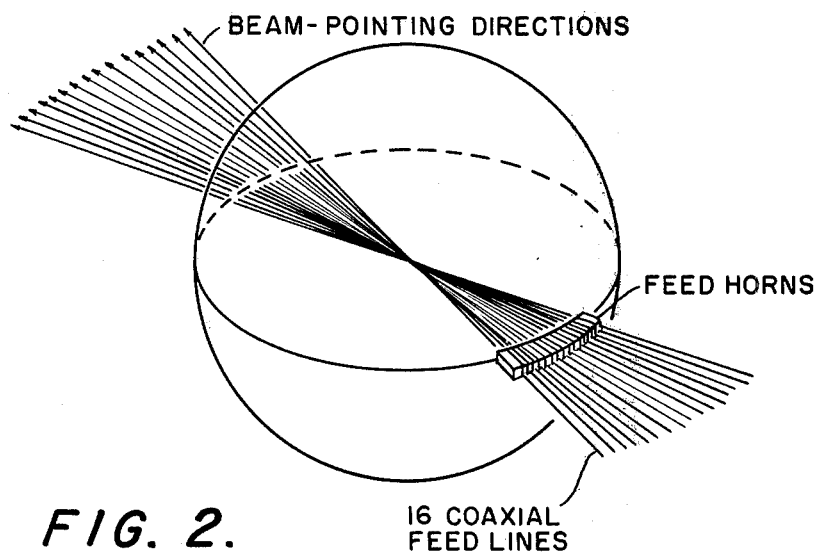
FIG. 2 illustrates a 16 in-line feed-horn arrangment.
Figure 3:
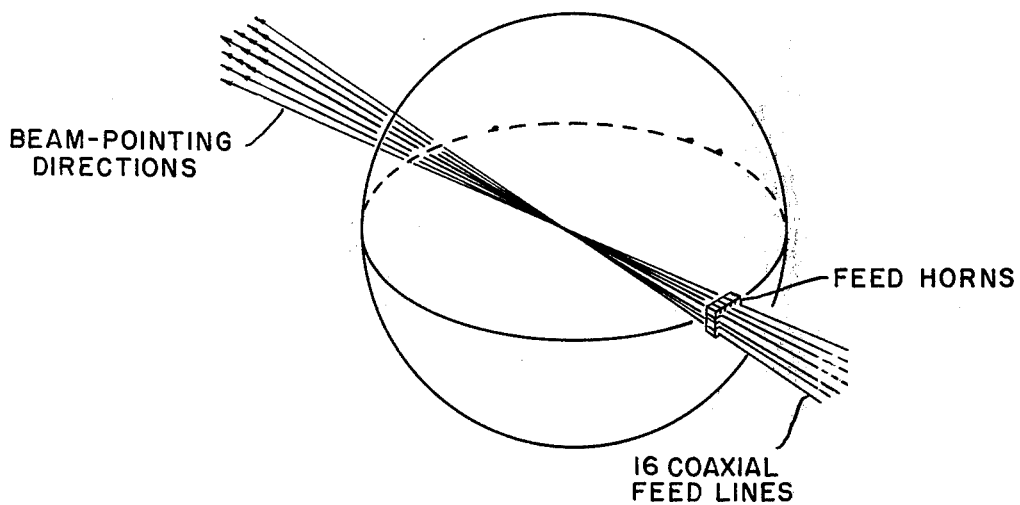
FIG. 3 illustrates a 4-by-4 feed-horn arrangment.

Any type of antenna configuration could be used to provide the overlapping beams, depending on the shape of the sector that is to be covered. As stated above, in this embodiment a one-dimensional set of 16 feed-horns is used as shown in FIG. 2. This configuration gives an angular coverage of about 31° azimuth by 3° in elevation to a sector of space diametrically opposed to the feed-horn locations. Another possible configuration would be the 2-dimensional, 4-by-4 arrangment of FIG. 3. Again, it should be emphasized that any type of compact configuration could be used depending on the area to be covered.

Figure 4:
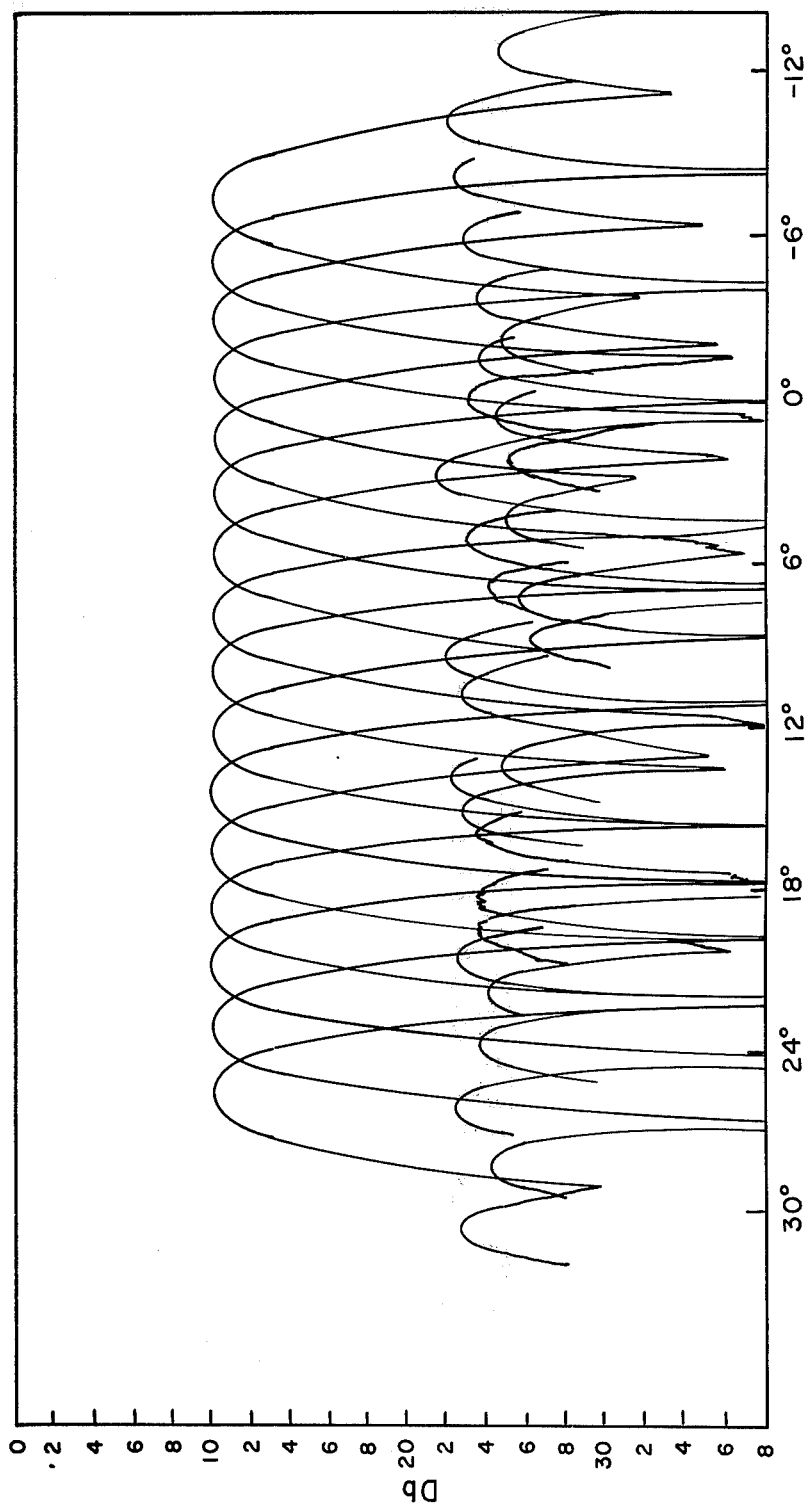
FIG. 4 is a graph of the composite patterns of sixteen in-line feed-horns using a seven-inch diameter lens.

In order to place 16 or more feed-horns behind a ceramic lens with the proper positioning such that the beams from the feed-horns will properly overlap, each feed-horn must be dielectrically loaded. This dielectric loading using polystyrene inserts allows the aperture of the feed-horn to be physically small but to appear electrically large. FIG. 4 shows the composite patterns of 16, miniaturized, contiguously placed, in-line feeds using a 7-inch diameter lens.

Figure 5:
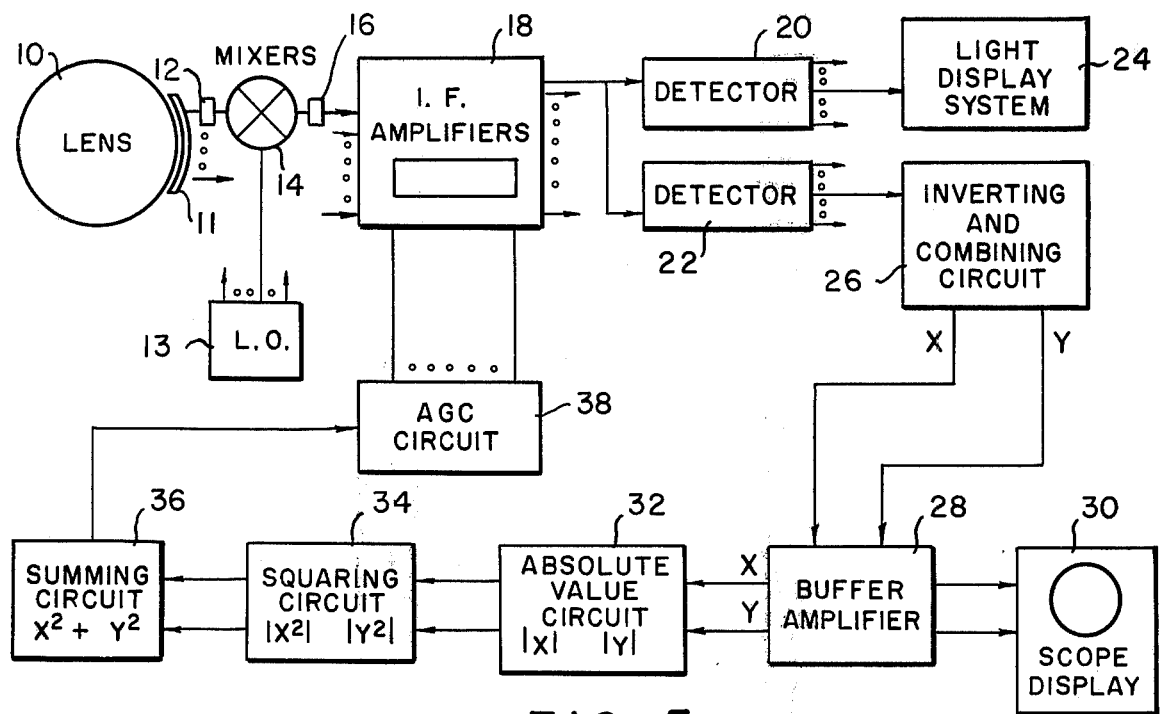
FIG. 5 is a block diagram of one embodiment of the present invention.

Referring to FIG. 5 a block diagram of the complete target angular location system is shown. The dielectric lens 10 picks up a target signal on one or two of its overlapping beams and focuses this signal into the proper feed-horns 11. Each feed-horn 11 is connected to an isolator 12 which allows propagation of energy in only one direction. The isolator is provided in each line to ensure that the antenna systems don't act as transmitters. Isolators are well-known in the art and one of the many companies that sells them is Hewlett-Packard Company. This one-direction signal is then applied to a balanced mixer 14. A local oscillator 13 applies a signal to the mixer 14 which acts to mix this signal with the incoming feed-horn signal and generate an I.F. signal. In this particular embodiment, an ortho-tee type of waveguide balanced mixer was used.

The I.F. output from each balanced mixer is then fed to its I.F. amplifier 18 through a well-known, impedance-matching, network 16.

The output from each I.F. amplifier is a K-band signal proportional in amplitude to the signal received in its corresponding feedhorn. This signal is fed into two separate d-c detectors 20 and 22.

Figure 10:
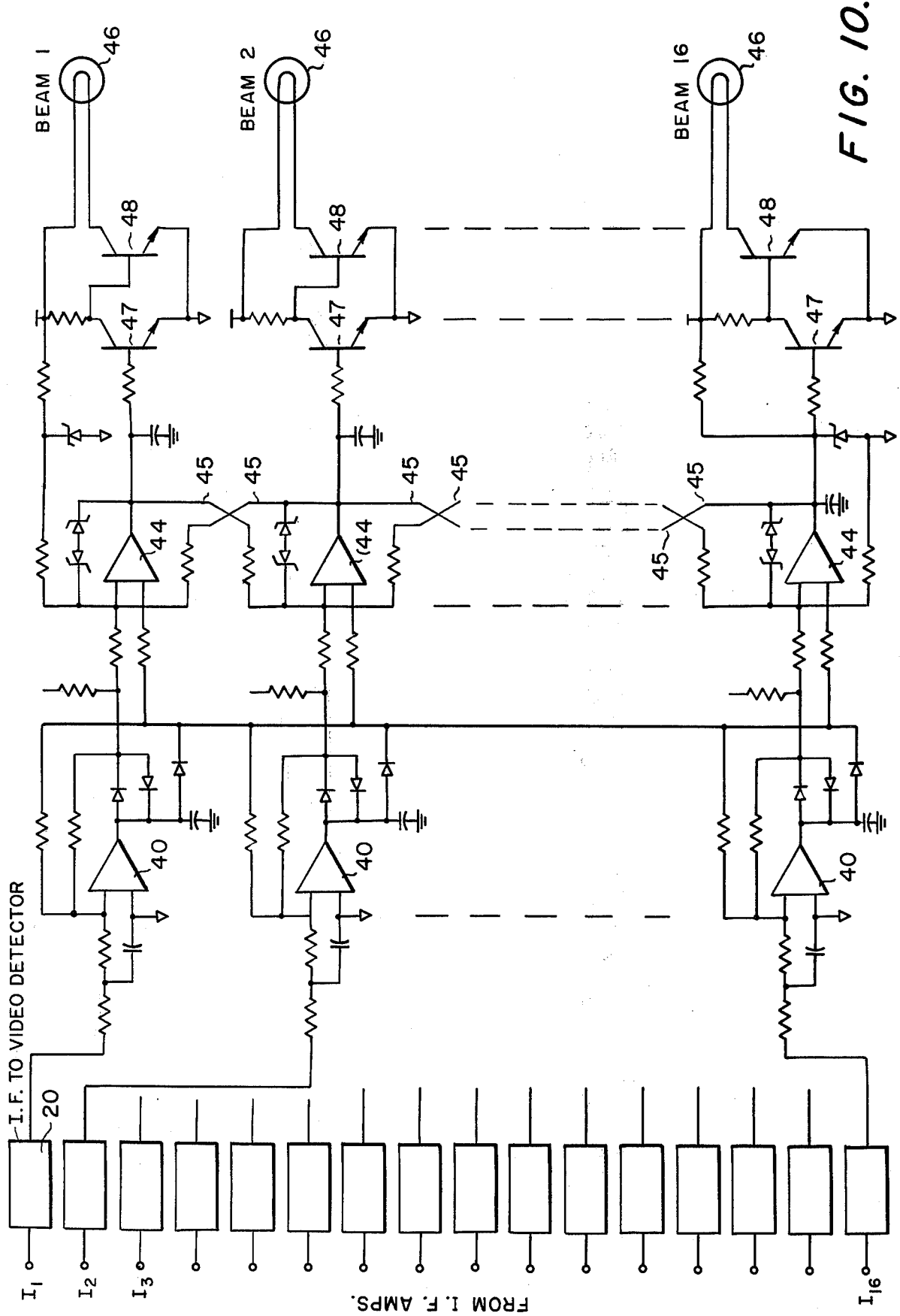
FIG. 10 is a circuit diagram of a light display system that could be used in the present invention.

The detector 20 in each of the sixteen receiving channels detects the amplified I.F. signal from each of the channels and applies it to a different amplifier from a set of 16 amplifiers 40 contained in the light display block 24. The actual internal circuitry of block 24 is shown in FIG. 10. The signal from each amplifier 40 is applied to an inverter 44. When the signal from one of the amplifiers 40 goes above a certain level, the inverted signal voltage from its respective inverter 44 will be low enough to bias the other 15 inverters 44 off by way of the feedback lines 45.

Each of these 16 amplifiers 40 is connected to one light (42) in a 16-light display. The amplifier 40 signal with the highest level, will turn its respective light 46 on, while biasing the other 15 amplifiers 40 off, as previously mentioned, thus indicating which feed-horn beam has the strongest signal. This is accomplished because the strongest channel will have a very low voltage signal at the output of its inverter 44. This low-voltage signal will bring the base voltage at transistor 47 low enough to bias it off. When transistor 47 stops conducting, the voltage at the base of the transistor 48 will rise high enough to place that transistor in a conductive state. Thus there is a path for the current to flow through that channel's respective light 46.

A brief discussion of how the scope display 30 can be used to compare signal levels in adjacent beams, thus giving a fine vernier of angular location, will facilitate a better understanding of the invention.

Figure 6:
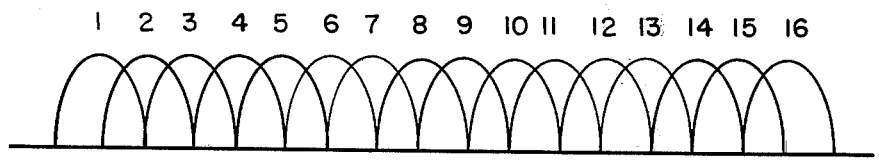
FIG. 6 is a graph representing the voltage response of a 16 in-line feed-horn arrangement.
Figure 7:
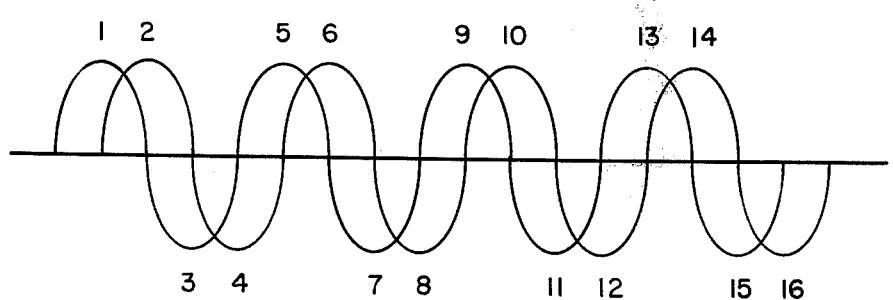
FIG. 7 is a graph representing the voltage response of the 16 beams after they have been inverted and combined into two sine-waves.
Figure 8:
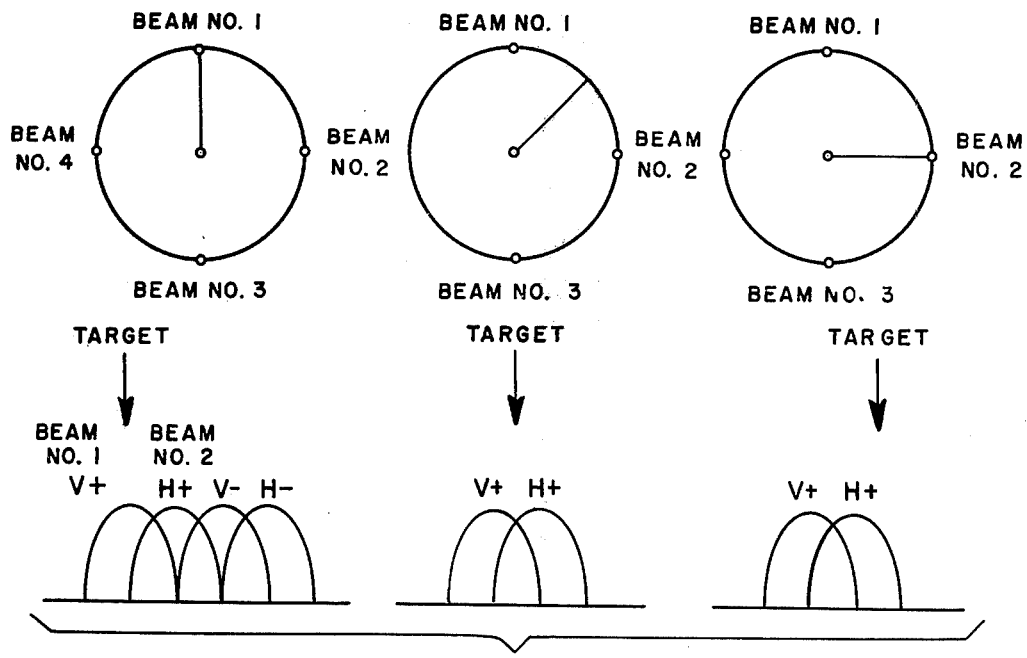
FIG. 8 shows the target presentation on the oscilloscope for different target positions relative to the antenna beams.

A target will be detected at most by two adjacent beams. Thus output voltages above a certain level will occur in only one or two adjacent channels at any given time. Upon close examination of the beam-shape of each channel, it can be seen that the voltage output as a function of target motion is very nearly a sine curve (FIG. 6). When the signs of alternative pairs of these voltage outputs are inverted and combined in a certain way, two approximate sine curves in quadrature are derived, as shown in FIG. 7, as the target moves across the field of view. Then by connecting one of the sinusoidal voltages to the vertical plates of a display device such as an oscilloscope and the other sinusoidal voltage to the horizontal plates, a dot will move around the scope. The location of the dot will correspond to the voltage vector sum of any two adjacent beams. FIG. 8 further illustrates this operation. As a target moves across the field of view from left to right, the first beam to receive power is beam No. 1. At the peak of beam No. 1, the voltage which is applied to the vertical scope deflection plates is represented on the scope as a dot with a voltage offset proportional to the amplitude of signal received. A 60 Hz chopper at the input to the scope alternately applies the signal to the scope and shorts out the scope input terminals. Thus a movable strobe line is created. The dot then becomes a line extending from a zero center position to the dot location. Target movement toward the location of beam No. 2 introduces a voltage output from beam two channel. The amplitude of the two voltages, beam No. 1 to the vertical and beam No. 2 to the horizontal plates appear on the scope as a line at an angle corresponding to the target angular location.

Continuing target motion in the same direction causes the line on the scope to rotate 360° for every five beams. In the 16 beam presentation, the line rotates 3¾ complete revolutions.

The angular distance between adjacent beam pointing directions is approximately 2°. The same 2° azimuthal target travel produces a vector rotation on the scope of 90° and displays the inherent accuracy that the system can achieve.

The complete display consists of both the light circuits and the scope circuit working together to locate the target. Since a light appears for each beam location, and the azimuthal target travel is 2° between beams, a light indicates on which particular beam a signal is arriving and the 90° arc traveled by the line on the scope when divided into small increments provides a fine vernier for the target location within that particular beam.

Figure 9:
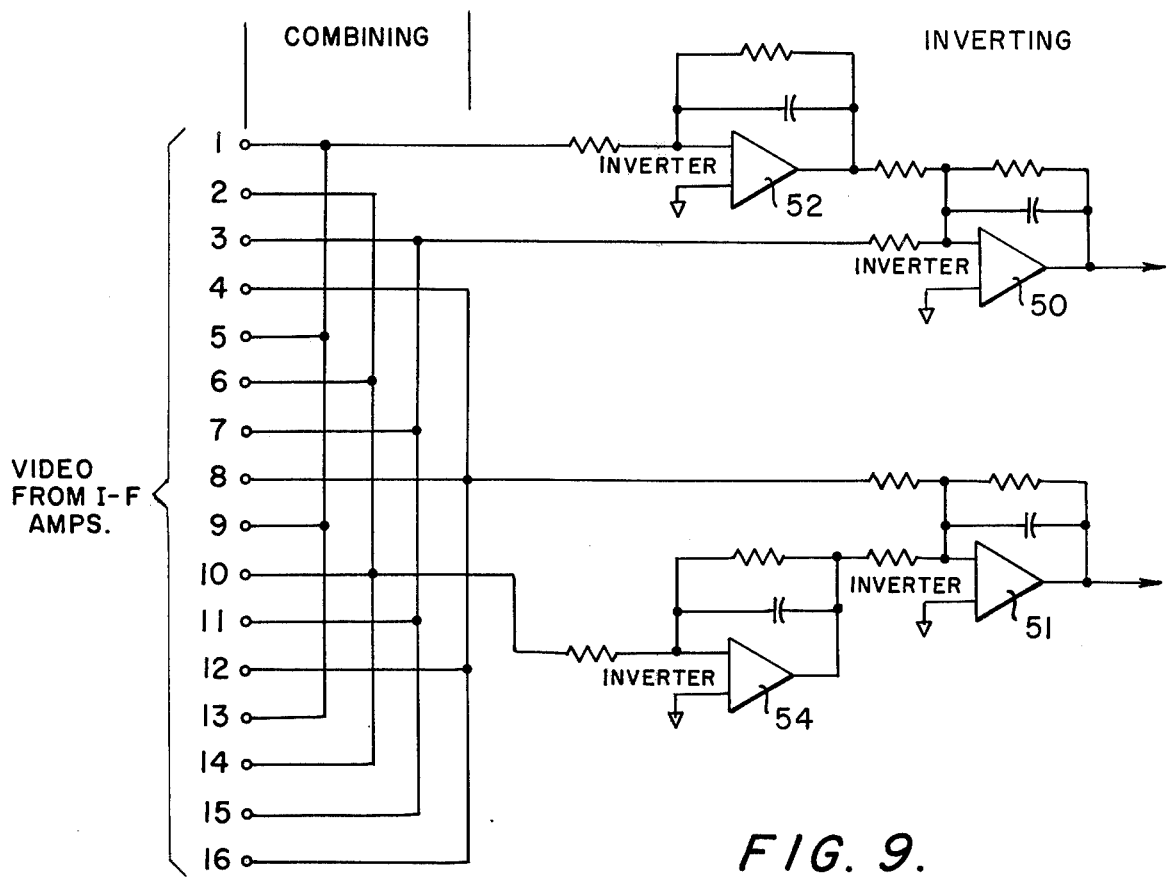
FIG. 9 is a circuit diagram of an inverting and combining circuit that could be used in the present invention.

This fine vernier comparison operation is implemented in FIG. 5 by first detecting the signal in detector 22. This detected signal is then applied to the Inverting and Combining circuit 26. This circuit acts to form the set of 16 detected antenna signals into two sine waves to be applied to the horizontal and vertical plates of a display device. To form these sine-waves, alternate pairs of detected signals are combined as shown in FIG. 9 and then appropriately inverted. Since a signal can only be detected on two adjacent channels at one time, there will be no confusion if channels 1, 5, 9, and 13 are tied together. Likewise, 2, 6, 10, and 14 are tied together, as are 3, 7, 11, 15 and 4, 8, 12, 16. The inverters 50 and 51 invert alternate pairs of detected signals. For example, channel 1 signals are passed through inverters 52 and 50, thus providing a double inversion (no inversion at all). Channel 2 signal are also double inverted once by the inverters 54 and 51. Channel 3 signals are combined with channel 1 signals at the input to the inverter 50 and inverted only once at inverter 50. Thus an approximate since wave has been formed by the combination of the channel 1 signal and the inverted channel 2 signal. Likewise the channel 4 signals are combined with the channel 2 signals at the input to the inverter 51 and then inverted only once by the inverter 51. Thus a second approximate sine wave has been formed by the combination of the channel 2 signal and the inverted channel 4 signal.

These two sine waves are applied to the buffer amplifier 28 which then applies them to the vertical and horizontal plates of a display device 30.

In order to have the line trace a true round circle, an AGC circuit can be used to control the level of the signal being received.

One method of implementing this is to set this controlled level equal to the radius squared of the circle to be traced on the display device. This operation is performed as follows in FIG. 5: The two sine-waves applied to the display device 30 are also applied to an absolute value circuit 32. The absolute values of these sine-waves are then squared in squaring circuit 34, summed in summing circuit 36, and then applied to a standard A.G.C. circuit 38. The AGC circuit 38 then limits the level at the I.F. amplifiers 18 to a constant equal to the radius squared of the circule to be traced.

Since the beam shapes are not true sine-waves, a certain non-linearity exists. Two sine-function generators could be incorporated in this system to improve linearity in the well-known manner.

Obviously, many modifications and variations of the present invention are possible in light of the above teachings. It is therefore to be understood that, within the scope of the appended claims, the invention may be practiced otherwise than as specifically described.

What is claimed is:

1. A system to process antenna beams to obtain target angular location comprising:
    a plurality of antennas disposed to provide overlapping output beams, thus providing complete coverage of some predetermined sector of area;
    mixing means for providing an I.F. signal from the output from each of said plurality of antennas;
    a plurality of first detector means, a different one for each one of said I.F. signals developed at said mixing means;
    comparison means to which the detected I.F. signals from each of said first detector means are applied for determining which of the I.F. signals from said plurality of antennas has the largest amplitude signal and thus the strongest target signal and displaying this information on a first display means;
    a plurality of second detector means, a different one for each one of the I.F. signals developed at said mixing means;
    inverting and combining means to which the detected I.F. signals from said second detector means are applied, said inverting and combining means selectively inverting and serially combining the I.F. signals from alternate antennas so that at least two approximate sine-waves are formed;
    second display means to which the two sine-waves are applied to vary the coordinates of the response in said display means in accordance therewith so that the antenna beam azimuth across which the target travels is expanded such that the target location within a particular beam can be determined very accurately.

2. A system to process antenna beams as in claim 1 wherein said display means has vertical and horizontal deflection plates to which the two sine-waves are applied respectively.

3. A system to process antenna beams as in claim 2 wherein each of said plurality of antennas comprises: a constant-dielectric, ceramic lens as the receiving aperture; and
    a plurality of feed-horns set behind said lens.

4. A system to process antenna beans as in claim 3 wherein said plurality of feed-horns are small, dielectrically loaded feed-horns.

5. A system to process antenna beams as in claim 2 wherein said plurality of antennas are disposed in a line, thus providing a line of overlapping beams.

6. A system to process antenna beams as in claim 1 wherein said mixer means comprises:
    a set of ortho-tee, waveguide, balanced mixers (one for each antenna input);
    a local oscillator for each one from said set of mixers;
    an I.F. amplifier connected to the output of each mixer output from said set of mixers.

7. A system to process antenna beams as in claim 1 wherein said comparison means comprises:
    a light display with a light representing each of the detected I.F. signals coming from said plurality of first detectors; and
    means for energizing the light connected to the largest amplitude signal of the I.F. signals.

8. A system to process antenna beams as in claim 2 wherein said inverting and combining means inverts alternate pairs of signals from the plurality of detected I.F. signals from said plurality of second detector means.

9. A system to process antenna beams as in claim 8 further comprising an A.G.C. circuit for controlling the level of the I.F. signals by limiting the level to a constant.

10. A system to process antenna beams as in claim 9 wherein said constant is equal to the radius squared of a circle which the two sine-waves developed by said inverting and combining means will trace when applied to said display means.

11. A system to process antenna beams as in claim 2 further comprising a set of function generators to form the two generated sine-waves into true sine-waves and thus improve linearity.

* * * * *